United States Patent
Shimizu et al.

(10) Patent No.: US 12,548,415 B2
(45) Date of Patent: Feb. 10, 2026

(54) TERMINAL DEVICE HAVING A SHIELDING PORTION THAT SHIELDS A LINE OF SIGHT OF AN INPUT DEVICE FROM A PERSON OTHER THAN THE USER

(71) Applicant: NEC Corporation, Tokyo (JP)

(72) Inventors: Takashi Shimizu, Tokyo (JP); Hiroshi Morimitsu, Tokyo (JP); Takahiro Ambe, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 18/832,194

(22) PCT Filed: Feb. 1, 2022

(86) PCT No.: PCT/JP2022/003821
§ 371 (c)(1),
(2) Date: Jul. 23, 2024

(87) PCT Pub. No.: WO2023/148818
PCT Pub. Date: Aug. 10, 2023

(65) Prior Publication Data
US 2025/0148884 A1    May 8, 2025

(51) Int. Cl.
*G07G 1/00* (2006.01)
(52) U.S. Cl.
CPC ......... *G07G 1/0018* (2013.01); *G07G 1/0045* (2013.01)
(58) Field of Classification Search
CPC .... G07G 1/0018; G07F 7/1033; G06F 3/0202
(Continued)

(56) References Cited

U.S. PATENT DOCUMENTS

| | | |
|---|---|---|
| 2010/0172033 A1 | 7/2010 | Radford |
| 2011/0018809 A1 | 1/2011 | Nochi et al. |

(Continued)

FOREIGN PATENT DOCUMENTS

| | | |
|---|---|---|
| CN | 103136878 A | 6/2013 |
| JP | 2001-109953 A | 4/2001 |

(Continued)

OTHER PUBLICATIONS

Machine translation of JP2001-109953 retrieved from European Patent office on Mar. 13, 2025 (Year: 2025).*

(Continued)

*Primary Examiner* — Suezu Ellis
(74) *Attorney, Agent, or Firm* — Sughrue Mion, PLLC (57) ABSTRACT

A terminal apparatus (10) is used when at least one of product registration processing and settlement processing is performed, and includes a housing (110), a first input device (172), and a shielding portion (300). The first input device (172) is provided on an upper surface of the housing (110), and receives an input of at least one of a character and a number from a user. The shielding portion (300) is provided on the housing (110), and shields a line of sight of the first input device (172) from a person other than a user. The shielding portion (300) includes a first member (302) and a second member (304). The first member (302) is located on one side of the first input device (172) when viewed from a user. The second member (304) is located on another side of the first input device (172) when viewed from a user.

6 Claims, 6 Drawing Sheets (58) Field of Classification Search
USPC .......................................................... 235/383
See application file for complete search history.

(56) References Cited

U.S. PATENT DOCUMENTS

| | | | | |
|---|---|---|---|---|
| 2011/0058321 A1* | 3/2011 | Yoshizawa | ........... | H05K 5/0204 |
| | | | | 361/679.01 |
| 2019/0147447 A1* | 5/2019 | Mcintyre | ............. | G06Q 20/341 |
| | | | | 705/41 |

FOREIGN PATENT DOCUMENTS

| JP | 2001-147763 A | 5/2001 |
|---|---|---|
| JP | 2001-325665 A | 11/2001 |
| JP | 2002-222466 A | 8/2002 |
| JP | 2009-531765 A | 9/2009 |
| JP | 2010-026776 A | 2/2010 |
| JP | 2010-211625 A | 9/2010 |
| JP | 2011-028508 | 2/2011 |
| JP | 2011-054109 A | 3/2011 |
| JP | 2012-014547 A | 1/2012 |
| JP | 2014-106620 A | 6/2014 |
| JP | 2017-091281 A | 5/2017 |
| JP | 2017-091282 A | 5/2017 |

OTHER PUBLICATIONS

Machine translation of JP2001-109953 retrieved from European Patent office on Mar. 13, 2025 (Year: 2025 (Year: 2025).*
JP Office Action for JP Application No. 2023-578221, mailed on Mar. 4, 2025 with English Translation.
International Search Report for PCT Application No. PCT/JP2022/003821, mailed on Apr. 12, 2022.
JP Office Communication for JP Application No. 2023-578221, mailed on May 20, 2025 with English Translation.

* cited by examiner

TERMINAL DEVICE HAVING A SHIELDING PORTION THAT SHIELDS A LINE OF SIGHT OF AN INPUT DEVICE FROM A PERSON OTHER THAN THE USER

This application is a National Stage Entry of PCT/JP2022/003821 filed on Feb. 1, 2022, the contents of all of which are incorporated herein by reference, in their entirety.

TECHNICAL FIELD

The present invention relates to a terminal apparatus.

BACKGROUND ART

At a retail store and the like, as represented by a POS terminal, a terminal apparatus that performs at least one of product registration processing and settlement processing is used.

Meanwhile, information having a high degree of confidentiality such as an identification number and personal information may be input to a terminal at a public place. For this point, for example, Patent Document 1 describes that a wall for shielding a line of sight is provided on an enclosure that houses a keypad. Further, Patent Documents 2, 3, and 4 describe that a cover is provided on a keypad of an automatic transaction apparatus.

Related Document

Patent Document

Patent Document 1: Japanese Patent Application Publication (Translation of PCT Application) No. 2009-531765
Patent Document 2: Japanese Patent Application Publication No. 2012-14547
Patent Document 3: Japanese Patent Application Publication No. 2017-91281
Patent Document 4: Japanese Patent Application Publication No. 2017-91282

DISCLOSURE OF THE INVENTION

Technical Problem

In recent years, in a terminal apparatus being used when at least one of product registration processing and settlement processing is performed, an opportunity to input information having a high degree of confidentiality is increasing. One example of an object of the present invention is to make information less likely to be leaked to another person when information having a high degree of confidentiality is input to such a terminal apparatus.

Solution to Problem

One aspect of the present invention provides a terminal apparatus that is used when at least one of product registration processing and settlement processing is performed, and includes:
a housing;
a first input device that is provided on an upper surface of a housing, and receives an input of at least one of a character and a number from a user; and
a shielding portion that is provided on the housing, and shields a line of sight of the first input device from a person other than the user, wherein
the shielding portion includes
a first member located on one side of the first input device when viewed from the user, and
a second member located on another side of the first input device when viewed from the user.

Advantageous Effects of Invention

According to one aspect of the present invention, when information having a high degree of confidentiality is input in a terminal apparatus being used when at least one of product registration processing and settlement processing is performed, the information is less likely to be leaked to another person.

BRIEF DESCRIPTION OF THE DRAWINGS

The above-described object, the other objects, features, and advantages will become more apparent from suitable example embodiments described below and the following accompanying drawings.

EXAMPLE EMBODIMENT

Hereinafter, example embodiments of the present invention will be described with reference to the drawings. Note that, in all of the drawings, a similar component has a similar reference sign, and description thereof will be appropriately omitted.

First Example Embodiment

Figure 1:
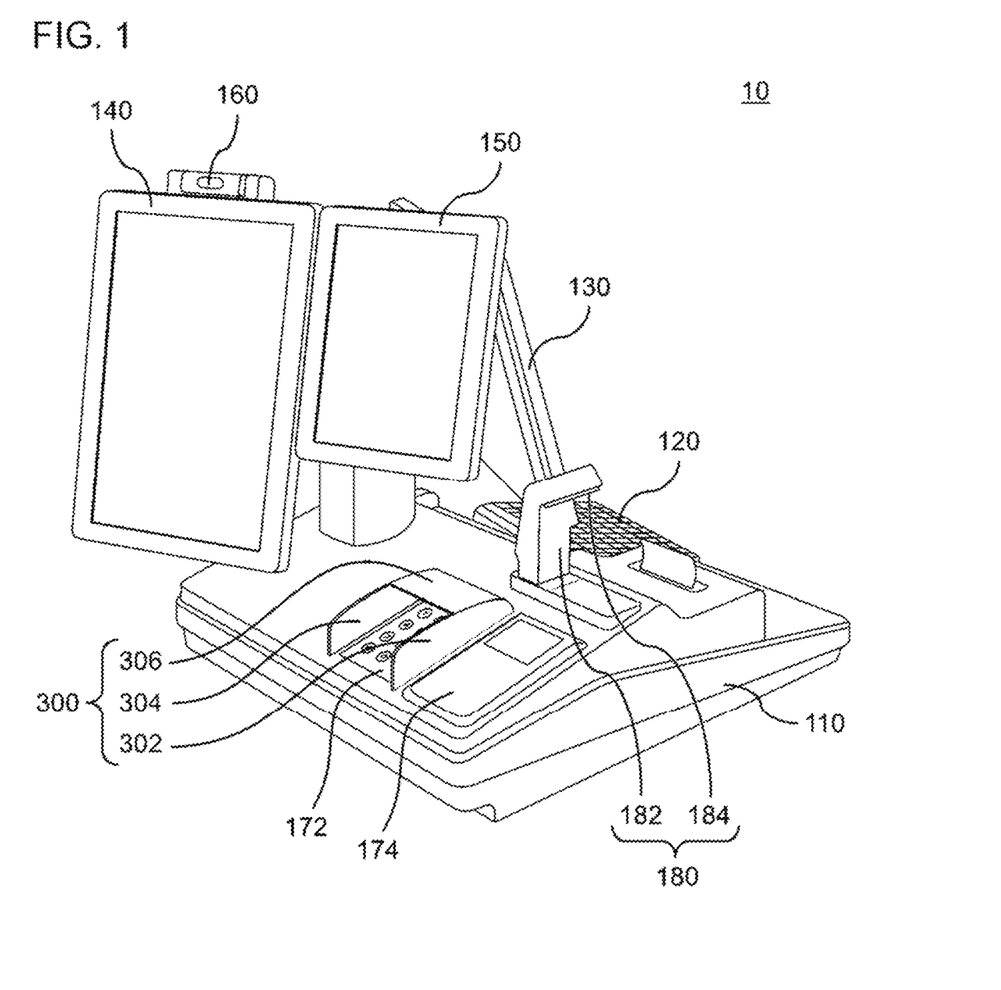
FIG. 1 is a perspective view of a terminal apparatus according to a first example embodiment.
Figure 2:
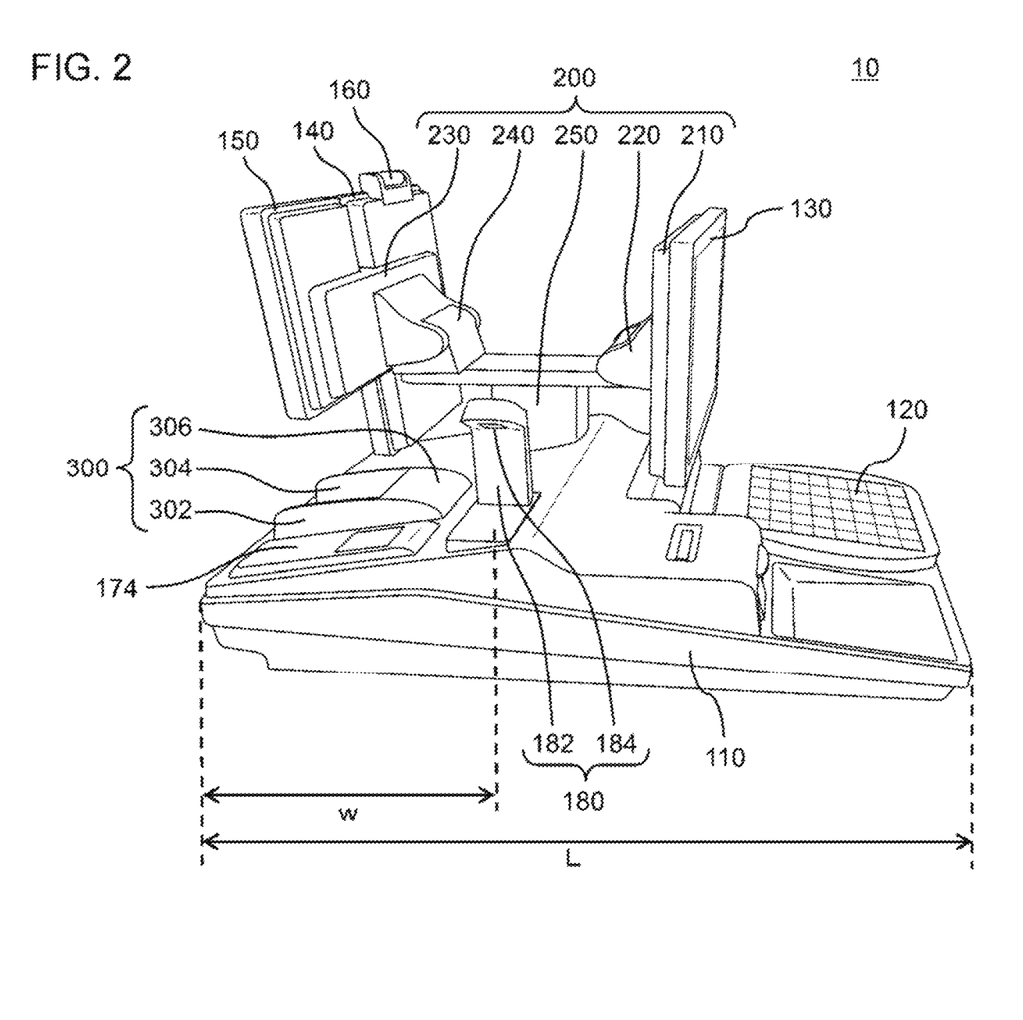
FIG. 2 is a side view of the terminal apparatus.

FIG. 1 is a perspective view of a terminal apparatus 10 according to the present example embodiment, and FIG. 2 is a side view of the terminal apparatus 10. The terminal apparatus 10 is used at a store, for example, and performs at least one of product registration processing and settlement processing. When the pieces of processing are performed, the terminal apparatus 10 is located between a salesclerk and a customer. One example of the terminal apparatus 10 is a POS terminal. The terminal apparatus 10 is disposed on a cash register counter, for example.

The terminal apparatus 10 includes a housing 110, a first input device 172, and a shielding portion 300. The first input device 172 is provided on an upper surface of the housing 110, and receives an input of at least one of a character and a number from a user. The shielding portion 300 is provided on the housing 110, and shields a line of sight of the first input device from a person other than a user. The shielding portion 300 includes a first member 302 and a second member 304. The first member 302 is located on one side of the first input device when viewed from a user. The second member 304 is located on another side of the first input device when viewed from a user. Hereinafter, the terminal apparatus 10 will be described in detail.

The terminal apparatus 10 includes the housing 110. An arithmetic processing unit is housed in the housing 110. The arithmetic processing unit performs at least one of, for example, both of the product registration processing and the settlement processing. The arithmetic processing unit may perform a part or the whole of the product registration processing, and may perform a part or the whole of the settlement processing. Further, the arithmetic processing unit may control the first display 130, and a second display 140 and a third display 150 described below.

The first input device 172 and a second input device 174 are disposed on one surface, for example, an upper surface of the housing 110. The first input device 172 and the second input device 174 are operated by a customer, and are thus located closer to a customer side than the center of the upper surface of the housing 110 in a plan view. As described above, the first input device 172 is a device for receiving an input of at least one of a character and a number. One example of the first input device 172 is a numeric keypad. One example of the second input device 174 is a reading apparatus that reads information from a medium. For example, the medium used herein may be a card including an IC chip, may be a portable terminal such as a smartphone, and may be paper on which a code is printed. The code used herein may be a bar code or a two-dimensional code. The second input device 174 may read information from a medium by generating an image, may acquire information by performing short-range wireless communication with a medium, and may acquire information from a magnetic medium in a medium. Note that, the second input device 174 may further have a function of writing information to a medium.

When an input surface of the first input device 172 can be seen from another person, for example, another customer or a salesclerk while a customer is operating the first input device 172, there is a possibility that information input from the customer to the first input device 172 is leaked to another person. In contrast, the terminal apparatus 10 includes the shielding portion 300. As described above, the shielding portion 300 includes the first member 302 and the second member 304.

The first member 302 and the second member 304 are located next to the first input device 172, and include a portion protruding upward from the upper surface of the housing 110. In this way, when there is another person in a lateral direction of the terminal apparatus 10, the another person cannot see an operation surface of the first input device 172. A height from the operation surface of the first input device 172 to an upper end of the first member 302 is, for example, equal to or more than 3 cm and preferably equal to or more than 5 cm, which is not limited thereto. A height from the operation surface of the first input device 172 to an upper end of the second member 304 is also the same.

In a depth direction of the first member 302 and the second member 304, i.e., a left-and-right direction in FIG. 2 (i.e., a direction from a customer to a salesclerk), both of the first member 302 and the second member 304 are longer than the operation surface (for example, a region where the numeric keypad is disposed) of the first input device 172. Note that, when the first input device 172 includes a display, it is preferable that the first member 302 and the second member 304 also extend next to the display.

Further, the shielding portion 300 includes a third member 306. The third member 306 is located opposite to a customer across the first input device 172. The third member 306 extends from a salesclerk side to the customer side above the first input device 172. In this way, when viewed from a salesclerk, at least the operation surface of the first input device 172 is covered with the third member 306. Further, a height of the operation surface of the first input device 172 is lower than the third member 306. Thus, a space for a customer to operate the operation surface is secured between the operation surface and the third member 306. Therefore, even when the third member 306 is provided, operability of the first input device 172 does not decrease.

In the examples illustrated in FIGS. 1 and 2, the third member 306 is supported by the upper end of the first member 302 and the upper end of the second member 304. In other words, the third member 306 extends over the first member 302 and the second member 304. In the depth direction of the first member 302 and the second member 304, i.e., the left-and-right direction in FIG. 2, a length of the third member 306 is equal to or more than 0.2 times and equal to or less than 0.5 times the first member 302. Then, an end of the third member 306 on the salesclerk side is connected to the upper surface of the housing 110. A positional relationship between the second member 304 and the third member 306 is also the same.

Further, an input device 120 and the first display 130 face the salesclerk side, and the second display 140 and the third display 150 face the customer side.

The input device 120 is operated by a salesclerk. One example of the input device 120 is a keyboard as described above, but may be another input device.

The first display 130 displays an operation screen for a salesclerk, and also displays at least one of information about the product registration processing and information about the settlement processing. There are various operation screens displayed on the first display 130.

The third display 150 is smaller than the second display 140. For example, a width in a height direction of the third display 150 is equal to or more than 0.5 times and equal to or less than 0.8 times a width in a height direction of the second display 140. Further, the second display 140 and the third display 150 face in the same direction. For example, an angle formed by a normal line of the third display 150 and a normal line of the second display 140 is, for example, equal to or less than 30° and, furthermore, equal to or less than 15°.

One of the second display 140 and the third display 150 displays information about the settlement processing of a product, for example, a registered product name, a price, a total payment amount, a payment method, an amount of change, and the like. Further, another of the second display 140 and the third display 150 displays an advertisement. However, the pieces of information displayed on the second display 140 and the third display 150 may be reversed.

Further, as illustrated in FIG. 2, the first display 130, the second display 140, and the third display 150 are supported by a support portion 200. Specifically, the support portion 200 includes a strut portion 250, holding portions 210 and 230, and rotating portions 220 and 240.

The strut portion 250 has a columnar shape or a cylindrical shape, and is provided upright from the upper surface of the housing 110. The holding portion 210 is fixed to an upper portion of the strut portion 250 via the rotating portion 220, and the holding portion 230 is fixed to the upper portion of the strut portion 250 via the rotating portion 240.

The holding portion 210 is fixed to a back surface of the first display 130. The rotating portion 220 attaches the holding portion 210 to an upper portion of the strut portion 250 in a state where the holding portion 210 can rotate in both of an up-and-down direction and the horizontal direction. Thus, the first display 130 can rotate in both of the up-and-down direction and the horizontal direction with respect to the housing 110.

The holding portion 230 is fixed to a back surface of the second display 140 and a back surface of the third display 150. The rotating portion 240 attaches the holding portion 230 to an upper portion of the strut portion 250 in a state where the holding portion 230 can rotate in both of the up-and-down direction and the horizontal direction. Thus, the second display 140 and the third display 150 can rotate in both of the up-and-down direction and the horizontal direction with respect to the housing 110.

Note that, in the example illustrated in FIG. 2, the second display 140 and the third display 150 are integral by the holding portion 230. Thus, orientations of the second display 140 and the third display 150 change simultaneously. However, the second display 140 and the third display 150 may be able to rotate independently of each other in at least one of the up-and-down direction and the left-and-right direction.

Further, a capturing unit 160 is attached to the second display 140. An image generated by the capturing unit 160 includes a customer. Then, the image is used when, for example, an advertisement to be displayed on the third display 150 or the second display 140 is selected. Note that, the capturing unit 160 may be attached to the third display 150.

In the example illustrated in FIG. 1, both of the second display 140 and the third display 150 are vertically oriented. However, at least one of the second display 140 and the third display 150, for example, the third display 150 may be horizontally oriented.

The terminal apparatus 10 further includes a code reader 180. The code reader 180 reads a code of a product, for example, at least one of a bar code and a two-dimensional code. In the example illustrated in FIG. 1, the code reader 180 includes a strut 182 and a reading unit 184. The strut 182 is provided upright from the upper surface of the housing 110. The reading unit 184 extends obliquely upward from an upper portion of the strut 182, and includes a mechanism for reading a code on a lower surface side. Since the reading unit 184 extends obliquely upward, a readable region of a code by the code reader 180 spreads obliquely downward from the lower surface of the reading unit 184. Thus, as compared to when the reading unit 184 extends in a horizontal direction in the code reader 180, a larger product can be disposed in the readable region.

Further, as illustrated in FIG. 2, when a width of the housing 110 is L in a depth direction of the housing 110, i.e., a direction connecting the customer side and the salesclerk side, a distance w from an end portion of the housing 110 on the customer side to the center of the strut 182 is equal to or more than L/3 and equal to or less than 2 L/3 from the customer side. Then, the reading unit 184 extends from the strut 182 toward a surface of side surfaces of the housing 110 that does not face a customer and a salesclerk. Thus, both of a salesclerk and a customer can use the code reader 180.

Figure 3:
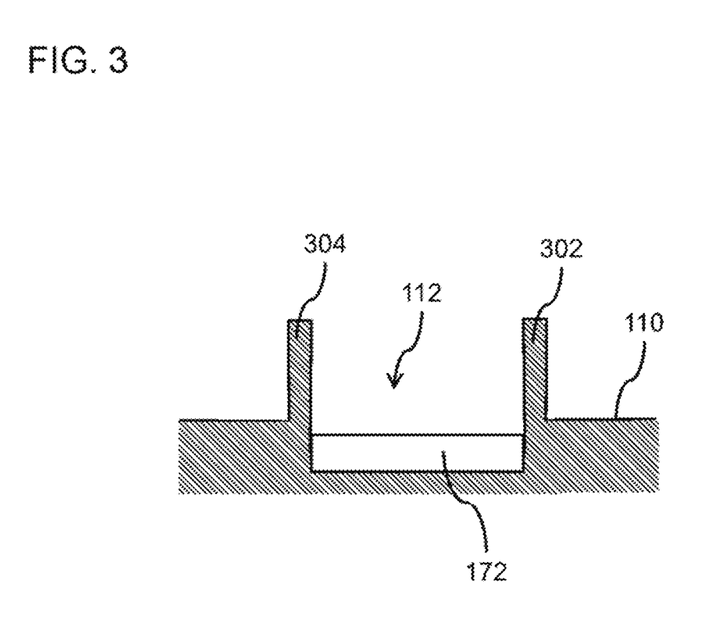
FIG. 3 is a cross-sectional schematic diagram illustrating one example of a configuration of a first member and a second member.

FIG. 3 is a cross-sectional schematic diagram illustrating one example of a configuration of the first member 302 and the second member 304. In the example illustrated in FIG. 3, a recessed portion 112 is provided in the upper surface of the housing 110. The first input device 172 is located in the recessed portion 112. The first member 302 and the second member 304 are located next to the recessed portion 112. Then, an upper surface of the first input device 172 is lower than the upper surface of the housing 110. Thus, a lower portion of the first member 302 and the second member 304 is formed by an inner wall of the recessed portion 112. In such a manner, a height of the first member 302 and the second member 304 with reference to the upper surface of the housing 110 can be set lower.

Figure 4:
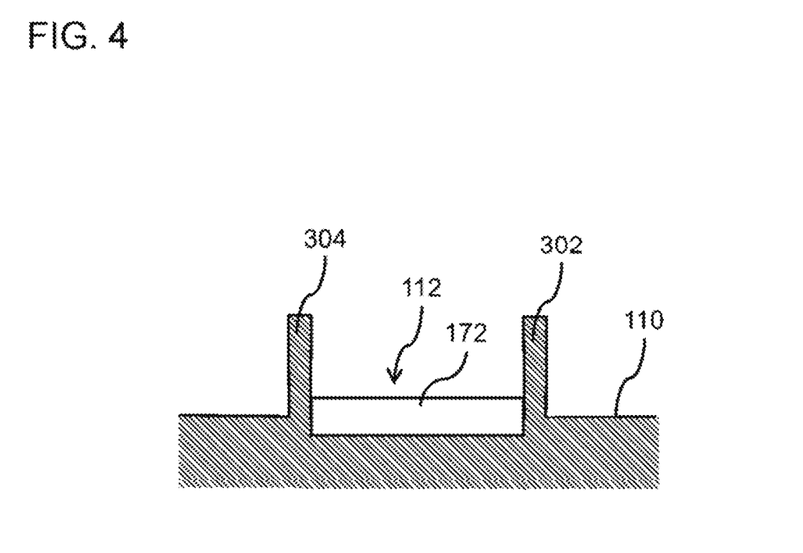
FIG. 4 is a diagram illustrating a modification example of FIG. 3.

FIG. 4 is a diagram illustrating a modification example of FIG. 3. Also, in the example illustrated in FIG. 4, the first input device 172 is located in the recessed portion 112, but the upper surface of the first input device 172 is higher than the upper surface of the housing 110. Also, in such a manner, the upper surface of the first input device 172 is lower than that when the recessed portion 112 is not provided, and thus a shielding effect by the first member 302 and the second member 304 increases.

Figure 5:
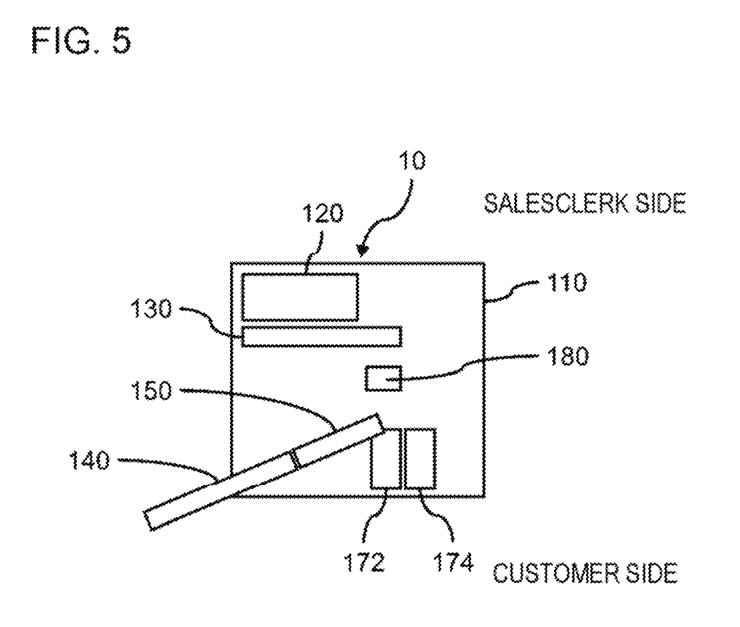
FIG. 5 is a plan view illustrating a positional relationship between a first input device and a code reader.

FIG. 5 is a plan view illustrating a positional relationship between the first input device 172 and the code reader 180. When viewed from a customer, the code reader 180 is located farther than the first input device 172, and at least a part of the code reader 180 overlaps the first input device 172 in a width direction, i.e., a left-and-right direction in FIG. 5 (i.e., a left-and-right direction when viewed from a customer). In such a manner, when viewed from a salesclerk, there is a high possibility that at least a part of the first input device 172 is hidden by the code reader 180. Therefore, there is a low possibility that information input to the first input device 172 is leaked to a salesclerk.

Particularly in the present example embodiment, as described above, the reading unit 184 extends obliquely upward from an upper portion of the strut 182. A direction in which the reading unit 184 extends is the left-and-right direction in FIG. 5, i.e., the left-and-right direction when viewed from a customer. Thus, when viewed from a salesclerk, there is a high possibility that at least a part of the first input device 172 is hidden by the reading unit 184.

As described above, according to the present example embodiment, the terminal apparatus 10 includes the shielding portion 300 around the first input device 172. Thus, when information is input to the first input device 172, the information is less likely to be leaked to another person.

Second Example Embodiment

Figure 6:
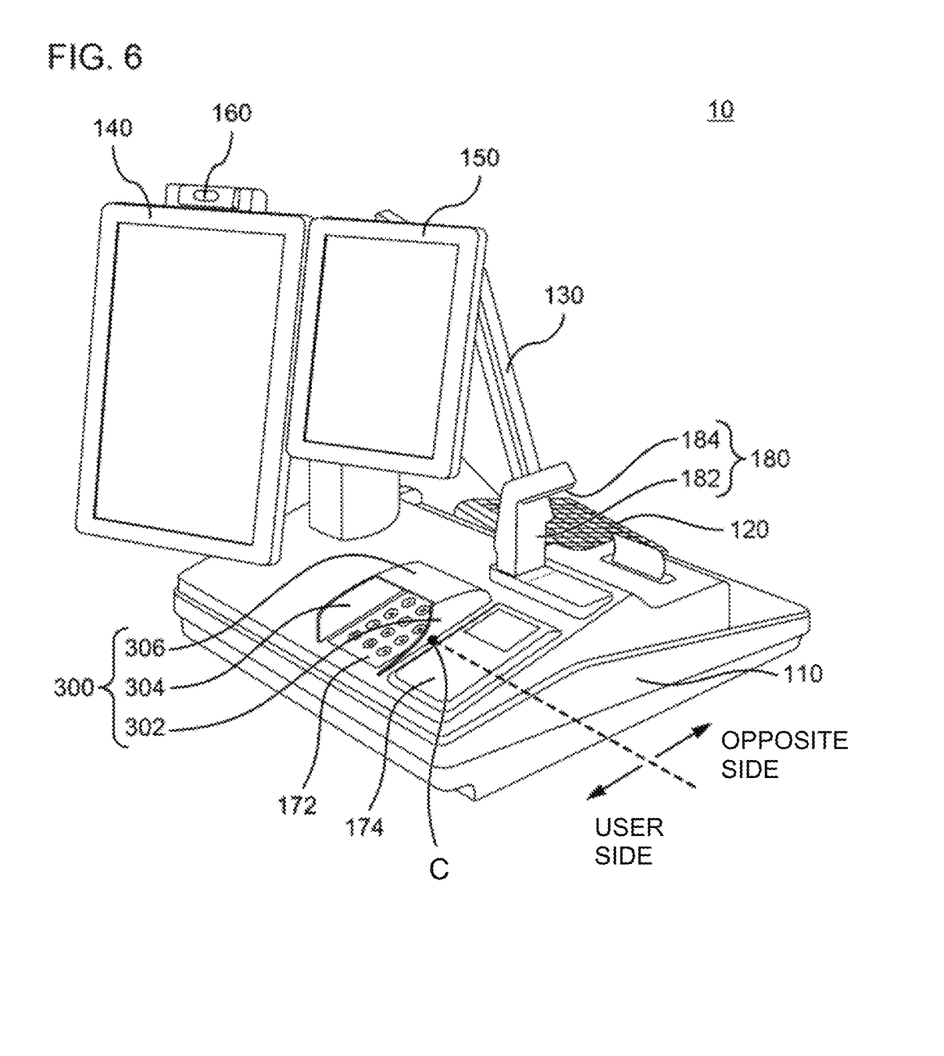
FIG. 6 is a perspective view of a terminal apparatus according to a second example embodiment.

FIG. 6 is a perspective view illustrating a terminal apparatus 10 according to the present example embodiment, and corresponds to FIG. 1 in the first example embodiment. The terminal apparatus 10 illustrated in FIG. 6 is similar to the terminal apparatus 10 according to the first example embodiment except for a shape of a first member 302.

The first member 302 is located between a first input device 172 and a second input device 174. Thus, there is a possibility that operability of the second input device 174 decreases due to the first member 302. For example, there is a possibility that a medium for inputting information to the second input device 174 physically comes into contact with the first member 302. In contrast, in the present example embodiment, a region of the first member 302 located on a customer side is lower than another region.

For example, in the depth direction, a first average value being an average of heights of a portion of the first member 302 located closer to the customer side than a center C is lower than a second average value being an average of heights of a portion of the first member 302 located opposite to a customer across the center C. A height of the first member 302 is defined as, for example, a height from a connection portion between the first member 302 and an upper surface of a housing 110 to an upper end of the first member 302. Then, the first average value is, for example, equal to or less than 0.5 times the second average value, and preferably equal to or less than 0.3 times the second average value. The first average value is, for example, equal to or less than 3 cm, preferably equal to or less than 2 cm, and more preferably equal to or less than 1.5 cm.

Further, when the second input device 174 includes a reading unit (for example, a region where a medium needs to be held up) that reads information from a medium, a part of the first member 302 overlaps the reading unit in the depth direction. In this case, an average value of heights of the region of the first member 302 overlapping the reading unit in the depth direction is preferably lower than the second average value described above. The average value is, for example, equal to or less than 0.5 times the second average value, and preferably equal to or less than 0.3 times the second average value.

Further, in this case, a third average value being an average of heights of the entire first member 302 is lower than a fourth average value being an average value of heights of an entire second member 304. The third average value is, for example, equal to or less than 0.7 times the fourth average value, and preferably equal to or less than 0.5 times the fourth average value.

Note that, when the first average value, the second average value, and the third average value are computed, a region within 5% from each end of the first member 302 in the depth direction may be excluded. Similarly, when the fourth average value is computed, a region within 5% from each end of the second member 304 in the depth direction may be excluded.

Also, according to the present example embodiment, the terminal apparatus 10 includes a shielding portion 300, and thus, when information is input to the first input device 172, the information is less likely to be leaked to another person. Further, a region of the first member 302 located on the customer side is lower than another region. Thus, even when the first member 302 is provided, operability of the second input device 174 does not decrease.

While the example embodiments of the present invention have been described with reference to the drawings, the example embodiments are only exemplification of the present invention, and various configurations other than the above-described example embodiments can also be employed.

A part or the whole of the above-described example embodiment may also be described in supplementary notes below, which is not limited thereto.

1. A terminal apparatus being used when at least one of product registration processing and settlement processing is performed, the terminal apparatus including:
    a housing;
    a first input device that is provided on an upper surface of a housing, and receives an input of at least one of a character and a number from a user; and
    a shielding portion that is provided on the housing, and shields a line of sight of the first input device from a person other than the user, wherein
    the shielding portion includes
       a first member located on one side of the first input device when viewed from the user, and
       a second member located on another side of the first input device when viewed from the user.
2. The terminal apparatus according to supplementary note 1 described above, further including
    a second input device that is located on an upper surface of the housing, is located opposite to the first input device across the first member, and acquires information from a medium, wherein
    a first average value being an average of heights of a portion of the first member located closer to the user side than a center is lower than a second average value being an average of heights of a portion of the first member located opposite to the user across the center.
3. The terminal apparatus according to supplementary note 2 described above, wherein
    the second input device includes a reading unit that reads information from the medium, and
    a height of a region of the first member overlapping the reading unit in a depth direction is lower than the second average value.
4. The terminal apparatus according to any one of supplementary notes 1 to 3 described above, further including
    a second input device that is located on an upper surface of the housing, is located opposite to the first input device across the first member, and acquires information from a medium, wherein
    a third average value being an average of heights of the first member is lower than a fourth average value being an average of heights of the second member.
5. The terminal apparatus according to any one of supplementary notes 1 to 4 described above, wherein
    an upper surface of the housing includes a recessed portion,
    the first input device is located in the recessed portion, and
    at least a part of the first member and at least a part of the second member are an inner wall of the recessed portion.
6. The terminal apparatus according to any one of supplementary notes 1 to 5 described above, wherein
    the shielding portion includes a third member located opposite to the user across the first input device.
7. The terminal apparatus according to any one of supplementary notes 1 to 6 described above, further including
    a code reader provided upright on an upper surface of the housing, wherein,
    when viewed from a customer, the code reader is located farther than the first input device, and at least a part of the code reader overlaps the first input device in a width direction.
8. The terminal apparatus according to supplementary note 7 described above, wherein
    the code reader includes
       a strut portion located on an upper surface of the housing, and
       a reading unit that extends from an upper portion of the strut portion in a lateral direction, and includes a reading surface for reading a code on a lower surface, and
    the reading unit extends in a left-and-right direction when viewed from a customer.
9. A terminal apparatus being used when at least one of product registration processing and settlement processing is performed, the terminal apparatus including:
    a housing; and
    a code reader provided upright from an upper surface of the housing, wherein
    the code reader includes
       a strut portion located on an upper surface of the housing, and
       a reading unit that extends from an upper portion of the strut portion in a lateral direction when viewed from a user, and includes a reading surface for reading a code on a lower surface.

REFERENCE SIGNS LIST

10 Terminal apparatus
110 Housing
112 Recessed portion
120 Input device
130 First display
140 Second display
150 Third display
160 Capturing unit
172 First input device
174 Second input device
180 Code reader
182 Strut
184 Reading unit
200 Support portion
210 Holding portion
220 Rotating portion
230 Holding portion
240 Rotating portion
250 Strut portion
300 Shielding portion
302 First member
304 Second member
306 Third member

What is claimed is:

1. A terminal apparatus being used when at least one of product registration processing and settlement processing is performed, the terminal apparatus comprising:
a housing;
a first input device that is provided on an upper surface of a housing, and receives an input of at least one of a character and a number from a user;
and
a shielding portion that is provided on the housing, and shields a line of sight of the first input device from a person other than the user, wherein
the shielding portion includes
a first member located on one side of the first input device when viewed from the user, and
a second member located on another side of the first input device when viewed from the user, and
the terminal apparatus further comprises:
a second input device that is located on the upper surface of the housing, is located opposite to the first input device across the first member, and acquires information from a medium, and
an average height of the first member along a length of the first member is lower than an average height of the second member along a length of the second member wherein
the upper surface of the housing includes a recessed portion,
the first input device is located in the recessed portion, and
at least a part of the first member and at least a part of the second member are an inner wall of the recessed portion.

2. The terminal apparatus according to claim 1, wherein a first average value being an average of heights of the first member along a first portion of the first member located on a first side of a center of the first member that is closer to a user side is lower than a second average value being an average of heights of the first member along a second portion of the first member located opposite to the user across the center of the first member.

3. The terminal apparatus according to claim 1, wherein the shielding portion includes a third member located opposite to the user across the first input device.

4. A terminal apparatus being used when at least one of product registration processing and settlement processing is performed, the terminal apparatus comprising:
a housing;
a first input device that is provided on an upper surface of a housing, and receives an input of at least one of a character and a number from a user;
and
a shielding portion that is provided on the housing, and shields a line of sight of the first input device from a person other than the user, wherein
the shielding portion includes
a first member located on one side of the first input device when viewed from the user, and
a second member located on another side of the first input device when viewed from the user,
the terminal apparatus further comprising
a second input device that is located on the upper surface of the housing, is located opposite to the first input device across the first member, and acquires information from a medium, wherein
a first average value being an average of heights of the first member along a first portion of the first member located on a first side of a center of the first member that is closer to a user side is lower than a second average value being an average of heights of the first member along a second portion of the first member located opposite to the user across the center of the first member,
the second input device includes a reader that reads information from the medium, and
a height of a region of the first member overlapping the reader in a depth direction is lower than the second average value.

5. A terminal apparatus being used when at least one of product registration processing and settlement processing is performed, the terminal apparatus comprising:
a housing;
a first input device that is provided on an upper surface of a housing, and receives an input of at least one of a character and a number from a user; and
a shielding portion that is provided on the housing, and shields a line of sight of the first input device from a person other than the user, wherein
the shielding portion includes
a first member located on one side of the first input device when viewed from the user, and
a second member located on another side of the first input device when viewed from the user, and
the terminal apparatus further comprises
a code reader provided upright on the upper surface of the housing, wherein,
when viewed from the user, the code reader is located farther than the first input device, and at least a part of the code reader overlaps the first input device in a width direction.

6. The terminal apparatus according to claim 5, wherein the code reader includes
a strut portion located on the upper surface of the housing, and a reader that extends from an upper portion of the strut portion in a lateral direction, and includes a reading surface for reading a code on a lower surface, and
the reader extends in a left-and-right direction when viewed from the user.

\* \* \* \* \*